Jan. 7, 1941.  L. C. WEATHERS  2,227,473
SELF-SYNCHRONOUS SYSTEM
Filed Aug. 11, 1939  2 Sheets-Sheet 1

Inventor
Leland Clay Weathers
By Bacon & Thomas
Attorneys

Jan. 7, 1941.  L. C. WEATHERS  2,227,473
SELF-SYNCHRONOUS SYSTEM
Filed Aug. 11, 1939  2 Sheets-Sheet 2

Inventor
Leland Clay Weathers
By Bacon & Thomas
Attorneys

Patented Jan. 7, 1941

2,227,473

UNITED STATES PATENT OFFICE 2,227,473

SELF-SYNCHRONOUS SYSTEM

Leland C. Weathers, Falls Church, Va., assignor to Dawson J. Burns, New York, N. Y.

Application August 11, 1939, Serial No. 289,666

7 Claims. (Cl. 172—239)

This invention relates to self-synchronous systems, and more particularly to systems in which hunting or spinning of the machines of the system is prevented and provision is made for compensating the system so that the receivers thereof assume positions corresponding to the transmitter under load conditions.

As is well known, self-synchronous machines are generally unstable in operation unless some means is incorporated therein for preventing hunting or spinning. Such hunting is an angular oscillation of the rotor which may be superimposed upon any rotation thereof. Any abruptly applied torque to either a receiver or transmitter causes an angle of disagreement between the receiver and transmitter. The alternating current excitation of the system causes a restoring torque to be set up which produces rotation of the receiver rotor to a position corresponding to the position of the transmitter rotor. This rotation causes single phase induction motor torque to be also set up in the receiver, acting in the direction of rotation of its rotor. This single phase induction motor torque, along with the inertia of the rotor, causes the rotor to be carried past the point of zero angle of disagreement with the transmitter, so that an oscillation is set up about the point of zero angle of disagreement. The induction motor action is in phase with the oscillation referred to and, in the absence of damping devices, results in the building up of this oscillation until the receiver falls out of step with the transmitter and "spins," that is to say, the rotor rotates in one direction as a single phase induction motor.

Mechanical dampers have been conventionally employed to exert sufficient mechanical friction upon the rotor of the receiver to damp these oscillations. However, the torque due to the friction opposes the restoring torque tending to bring the receiver to zero angle of disagreement, such that the rotor does not, in general, stop at the zero angle even if no external load is applied to the receiver. Thus, mechanical dampers are particularly disadvantageous in self-synchronous systems, as the position of zero angle of disagreement is almost always the desired position. Increasing the size of the transmitter and receiver is not effective, as an increase in size of the machines requires a mechanical damper providing correspondingly increased mechanical friction in order to damp out oscillations.

The single phase induction motor action causing the oscillation referred to above involves the presence of an oscillating field in quadrature with the main oscillating field of the self-synchronous machines. By providing balanced impedance quadrature exciting circuits, paths for alternating currents of the correct phase to oppose the quadrature oscillating field are provided, so that the quadrature oscillating field is substantially eliminated and the machines rendered stable in operation without the employment of mechanical dampers.

In accordance with the present invention, it has been found that the quadrature exciting circuits referred to can be employed to compensate the system so as to bring the receivers to zero angle of disagreement even when operating under mechanical loads. This is accomplished by increasing the alternating current voltage of one exciting circuit so as to increase the excitation in one quadrature axis and decreasing the alternating current voltage of the other exciting circuit so as to simultaneously decrease the excitation in the other quadrature axis. The result is to shift the direction of oscillation of the exciting field in one of the machines. Thus, any angle of disagreement between the rotor and transmitter caused by a load upon the receiver can be compensated for by rotating the exciting field in one of the machines an amount equal to the angle of disagreement between the receiver and transmitter caused by the load upon the receiver.

It is, therefore, an object of the invention to provide a self-synchronous system stabilized against oscillation or spinning of the machines without the employment of mechanical dampers, in which any angle of disagreement between the machines due to loads on the receiver may be compensated for to bring the machines to zero angle of disagreement.

Another object of the invention is to provide a self-synchronous system involving quadrature exciting circuits in which the voltage in one exciting circuit may be increased while the voltage in the other exciting circuit is simultaneously decreased to rotate the field in one of the machines.

Another object of the invention is to provide a self-synchronous system in which three wire machines having no exciting windings are employed in combination with machines excited with alternating current and in which means is provided to rotate the field in the machine excited by the alternating current to compensate for an angle of disagreement between machines due to a load upon the receiver.

Other objects and advantages of the invention will appear in the following description of preferred embodiments of the invention, shown in the attached drawings, of which:

Figure 1:
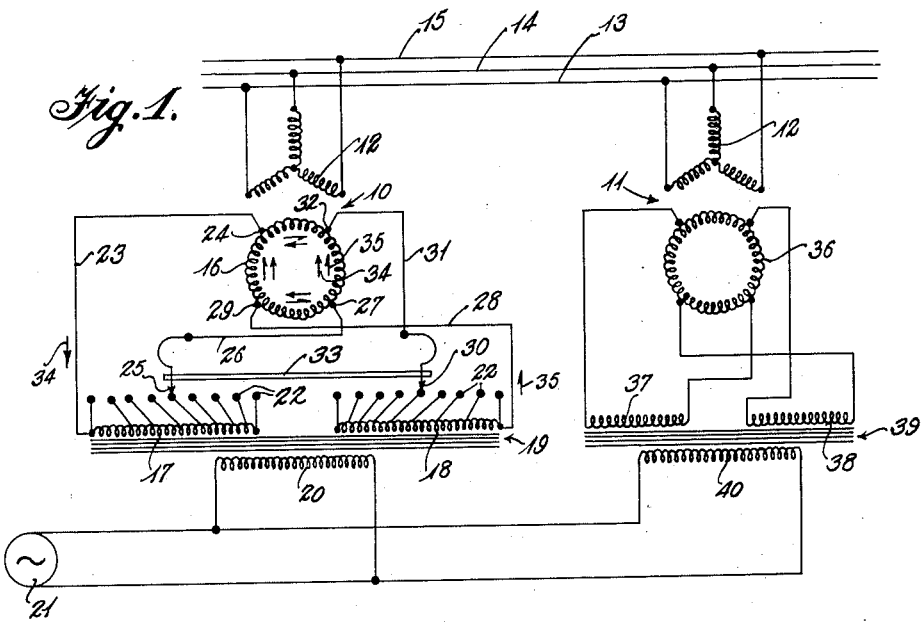
Figure 1 is a schematic diagram of a system in accordance with the present invention.

Referring to the drawings, and more particularly to Figure 1, 10 indicates one machine of a self-synchronous system and 11 indicates a second machine electrically connected to the machine 10. Each of the machines 10 and 11 is provided with a similar secondary winding 12, the windings 12 being connected to each other through conductors 13, 14 and 15. The machine 10 is likewise provided with a single closed primary or exciting winding 16 connected to be dually excited in quadrature from separate secondary transformer windings 17 and 18 of a transformer 19 provided with a primary 20 connected to a single phase source of alternating current power 21. The transformer secondary windings 17 and 18 are each provided with a plurality of taps 22. One terminal of the transformer secondary winding 17 is connected by a conductor 23 to the primary winding 16 of the machine 10 at the point 24.

An adjustable contact 25 is arranged to selectively engage taps 22 of the secondary winding 17 and is connected by a conductor 26 to a point 27 on the primary windings 16 of the machine 10. The transformer secondary winding 18 similarly has one terminal connected through a conductor 28 to a point 29 on the windings 16 of the machine 10. An adjustable contact 30 is also arranged to selectively engage the taps 22 of the secondary transformer winding 18 and is connected through a conductor 31 to a point 32 upon the primary winding 16 of the machine 10. The points of connection 24 and 27 of the transformer secondary winding 17 to the winding 16 are preferably diametrically opposed, and the same is true of the points of connection 29 and 32 of the transformer secondary winding 18. The points of connection 24 and 27 are also preferably in quadrature with the points of connection 29 and 32, so that transformer secondary winding 17 is connected to the motor winding 16 in quadrature with the transformer secondary winding 18.

The adjustable contacts 25 and 30 are preferably carried by a single operating member 33 so that they can be simultaneously moved to increase the voltage across the points of connection 29 and 32 of the motor winding 16 while decreasing the voltage across the points of connection 24 and 27, and vice versa. By suitably connecting the taps 22 to the transformer windings 17 and 18, the total field set up by the winding 16 may be maintained substantially constant and the effect of moving the operating member 33 is to rotate the field of the winding 16. If the adjustable contacts 25 and 30 engage the mid taps of the respective transformer windings 17 and 18, the voltages applied across the winding 16 are equal. If instantaneous values of voltages produced by the windings 17 and 18 are assumed to be in the direction of the arrows 34 and half arrows 35, respectively, it will be noted that the voltages oppose in opposite quadrants of the winding 16 and add in opposite quadrants in quadrature thereto. If the voltages of the transformer windings 17 or 18 are equal, no current will flow through quadrants in which these voltages oppose. However, moving the operating member 33 so that the voltages are unequal will cause current to flow in all of the windings and rotate the oscillating field set up by the single phase excitation.

The machine 11 may have a primary winding 36 similar to the primary winding 16 in the machine 12. The primary winding 36 of the machine 11 may also be arranged for dual excitation from independent secondary transformer windings 37 and 38 of a dual transformer 39. The transformer 39 is also provided with a primary winding 40, preferably connected to the same source of power 21, but which can be connected to any source of power furnishing alternating current of the same frequency and bearing a definite phase relationship to that of the source 21. The field set up in the machine 11 by the alternating current energization of the winding 36 has a fixed axis of oscillation. Either the motor 10 or the motor 11 may be employed as a transmitter or receiver and movement of the operating member 33 for the adjustable contacts 25 and 30 will tend to cause rotation of the rotor of one of the machines with respect to the other. Thus, any torque caused by a load applied upon the receiver and producing an angle of disagreement between the machines may be compensated for by moving the operating member 33 so as to cause the rotor of the receiver to rotate to a position corresponding to the rotor of the transmitter.

Figure 2:
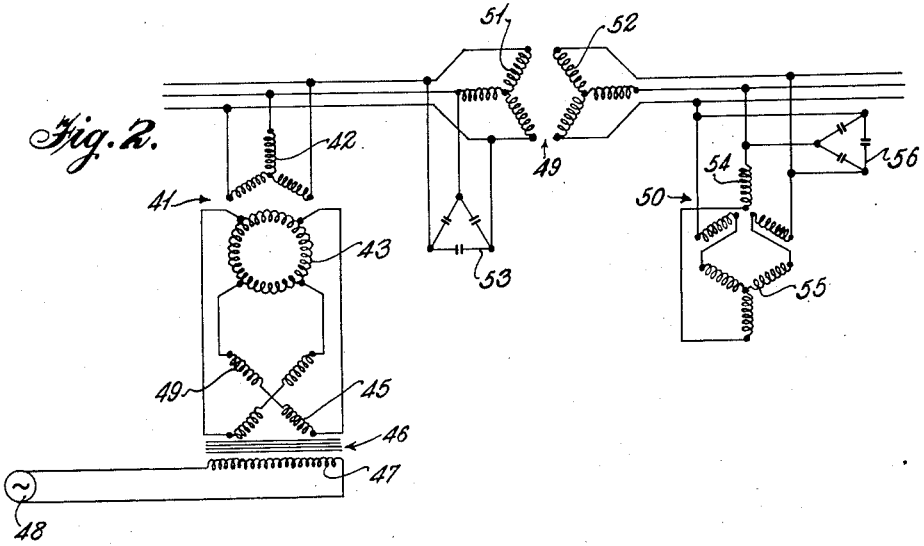
Figure 2 is a similar diagram showing a modified means for compensating one of the machines.

A modified compensation system is shown in Figure 2, in which a motor 41 is provided with a secondary winding 42 and a primary winding 43 dually excited from separate secondary transformer windings 44 and 45 of a transformer 46. The transformer 46 is also provided with a primary winding 47 energized from a source of alternating current power 48. The transformer 46 may be similar to a voltage regulator in that the secondary windings are placed on a member rotatable with respect to the member having the primary windings. The windings 44 and 45 may be positioned at right angles to each other so that rotation of one member of the transformer with respect to the other increases the voltage in the other winding 45, or vice versa. Thus, rotation of the rotatable member of the transformer 46 will cause rotation of the field in the motor 41 due to energization of the winding 43.

The system of Figure 2 is also shown as including a differential motor 49 positioned between the machine 41 and the machine 50. The differential motor 49 may be of any conventional type such as a machine having similar phase wound windings 51 and 52 on relatively rotatable members. As the machine 49 has no excitation directly from the alternating current source, a condenser system 53 may be connected across the winding 51 thereof in order to compensate, at least in part, for the lagging current normally drawn by the highly inductive circuits of machine 49. The machine 50 is shown as being a three wire machine having a phase wound winding 54 upon one member thereof connected in series with a phase wound winding 55 upon the other member thereof. As in the case of the machine 49, it is preferred to connect a condenser system 56 across the winding 54 of the machine. Either the machine 41 or the machine 50 can be either a transmitter or receiver, and mechanical rotation of one of these machines will cause the other to rotate to drive a load. Any angle of disagreement between the machines caused by the load can be compensated for by rotating the rotatable member of transformer 46. The differential machine 49 can be mechanically driven to drive whichever machine 41 or 50 is functioning as a receiver independent of the other machine as a transmitter. It is illustrated in this system to show that differential machines may be employed in systems in accordance with the present invention and such a differential machine may be employed between the machines of any of Figures 1, 3 and 4.

It will be noted that the machine 50 is a three wire machine in that it requires but three wires, in contradistinction to the machine 11 of Figure 1 which requires five wires. The machine 50 turns through twice the angle of the machines 41 and 49 and assumes a position in which the field set up by its windings 54 and 55 are in alignment.

Figure 3:
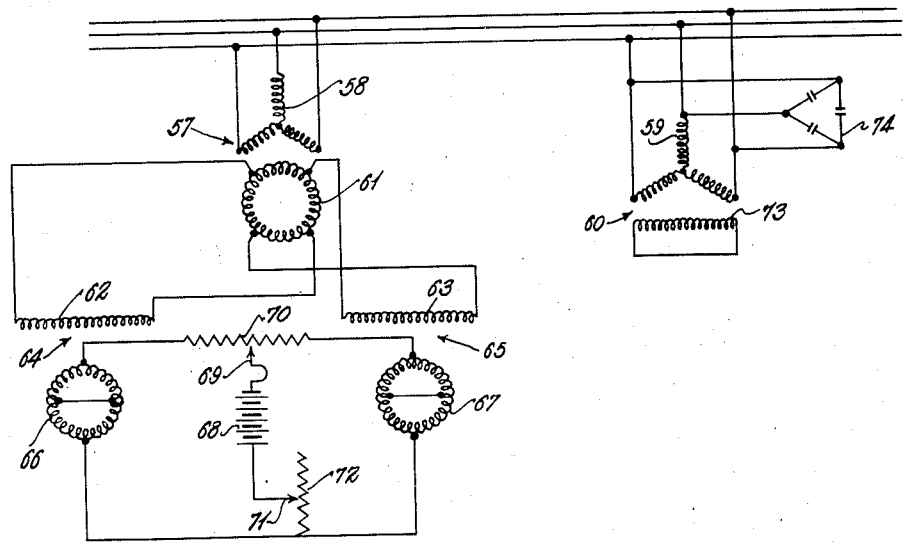
Figure 3 is a similar diagram showing a still further modification of a compensating circuit.

A still further compensating system is shown in Figure 3 in which the machine 57 is provided with a phase wound winding 58 upon one member thereof interconnected with a similar winding 59 upon a modified type of three wire machine 60. The machine 57 includes a primary winding 61 dually excited from the alternating current windings 62 and 63 of single phase alternators 64 and 65, respectively. The single phase alternators 64 and 65 are each provided with field windings 66 and 67, respectively, excited from a source of direct current shown as a battery 68. The field winding 66 and 67 may be differentially excited by moving an adjustable contact 69 engaging a resistor 70. The total excitation of the two windings 66 and 67 may be adjusted by moving an adjustable contact 71 engaging a resistor 72. By moving adjustable contact 69, the voltage induced in the winding 62 of the alternator 64 may be increased at the same time that the voltage induced in the winding 63 of the alternator 65 is decreased, and vice versa. Thus, varying the position of the adjustable contact 69 varies the voltage applied across the winding 61 of the motor 57 so that the field produced by the winding 61 is rotated. The machine 60 is a modified type of three wire receiver in which a short circuited winding 73 is employed on the other member of the machine. This winding will attempt to assume a position in which the total flux therethrough is a maximum, so that the rotor of this machine follows the rotation of the rotor of the machine 57. It is also preferable to connect a condenser system 74 across the winding 59 of this machine to compensate, at least in part, for lagging current normally taken by the machine.

Figure 4:
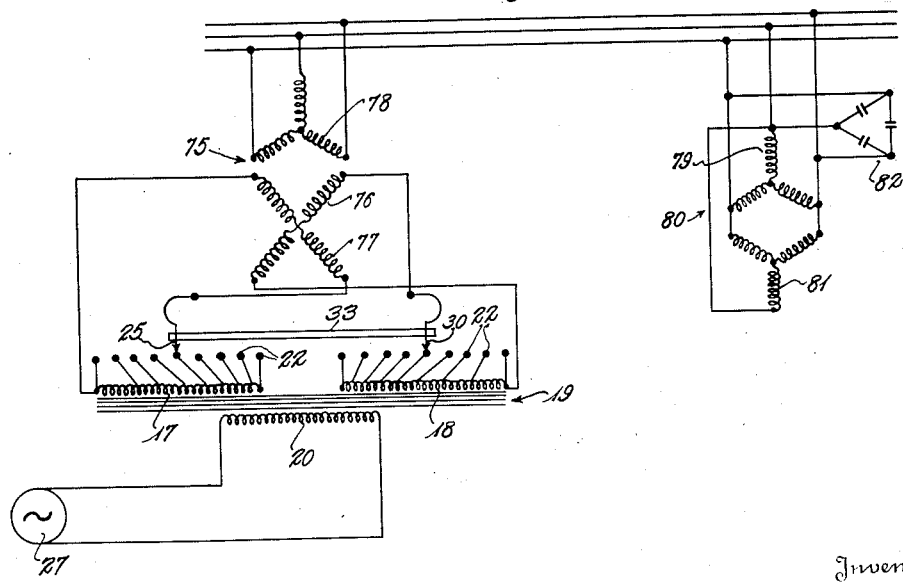
Figure 4 is a diagram similar to Figure 1 illustrating the employment of separate field windings upon one of the machines.

In the system of Figure 4, an adjustable tap transformer 19, entirely similar to the adjustable tap transformer of Figure 1, is employed in combination with a machine 75 having two separate primary windings 76 and 77 upon one member thereof. The windings 76 and 77 are positioned at right angles to each other and the winding 76 is connected across the transformer secondary winding 18, while the winding 77 is connected across the transformer secondary winding 17. Moving the operating member 33 to move the adjustable contacts 25 and 30 engaging the taps 22 of the transformer secondary windings varies the voltages applied across the windings 76 and 77 to rotate the field set up by these windings in the machine 75. The machine 75 is included to illustrate that separate primary windings may be employed in any of the machines of the present application which have alternating current excitation directly from an alternating current source. The employment of such separate primary windings is not, however, as effective in preventing hunting or spinning of the various machines as are the single phase windings disclosed in Figures 1, 2 and 3.

The machine 75 is also provided with a secondary winding 78 connected to a similar winding 79 on a three wire machine 80. The machine 80 has a second winding 81 upon the other member of the machine connected in parallel with the winding 79. A condenser system 82 is preferably connected across the winding 79. The operation of the machine is similar to the machine 50 of Figure 2 and differs therefrom only in that the windings of machine 80 are connected in parallel instead of being connected in series.

Any of the machines 11 of Figure 1, 50 of Figure 2, 60 of Figure 3, or 80 of Figure 4 may be employed with any of the machines 10 of Figure 1, 41 of Figure 2, 57 of Figure 3 or 75 of Figure 4. The dual excitation of the machines receiving alternating current excitation directly from an alternating current source such as the machines 10 and 11 of Figure 1, 41 of Figure 2, 57 of Figure 3 and 75 of Figure 4 not only provides for compensating the systems against loads in the receivers but prevents hunting and spinning as above described. If the load upon a receiver in a particular system is substantially constant, the degree of compensation for the particular load can be left substantially constant, or if the load upon the receiver varies, the amount of compensation may be simultaneously varied to insure that the rotors of the receivers and transmitters remain in corresponding positions.

This application is a continuation in part of my copending application Serial No. 220,542, filed July 21, 1938.

While I have disclosed the preferred embodiments of my invention, it is to be understood that the details thereof may be varied within the scope of the following claims.

I claim:

1. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, two electrically independent sources of alternating current, at least one of said machines having field windings upon the other member thereof excited in quadrature from said sources of alternating current, and means to vary the extent of excitation in one quadrature axis with respect to the other quadrature axis to rotate the field produced by said excitation in order to compensate for a load upon a machine operating as a receiver, said other members of the other of said machines having means acting with the synchronizing field of said other of said machines to provide a torque tending to maintain corresponding angles between the relatively rotatable members of all of said machines.

2. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, two electrically independent sources of alternating current, at least one of said machines having field windings upon the other member thereof excited in quadrature from said sources of alternating current, and means to increase the excitation of said windings in one axis while decreasing the excitation in the other quadrature axes in order to rotate the field produced by said excitation to compensate for a load upon a machine operating as a receiver, said other members of the other of said machines having means acting with the synchronizing field of said other of said machines to provide a torque tending to maintain corresponding angles between the relatively rotatable members of all of said machines.

3. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, a source of alternating current, a transformer having a primary winding connected to said source and two electrically independent secondary windings, at least one of said machines having field windings upon the other member thereof excited in quadrature from said secondary windings, and means to increase the output voltage of one secondary winding while decreasing the output voltage of the other secondary winding to rotate the field produced by said field windings to compensate for a load upon a machine operating as a receiver, said other members of the other of said machines having means acting with the synchronizing field of said other of said machines to provide a torque tending to maintain corresponding angles between the relatively rotatable members of all of said machines.

4. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, a source of alternating current, a transformer having a primary winding connected to said source and two electrically independent secondary windings, at least one of said machines having field windings upon the other member thereof excited in quadrature from said secondary windings, and means to increase the output voltage of one secondary winding while decreasing the output voltage of the other secondary winding to rotate the field produced by said field windings to compensate for a load upon a machine operating as a receiver, said means comprising a plurality of taps connected to each of said secondary windings and simultaneously movable contact members engaging said taps, said other members of the other of said machines having means acting with the synchronizing field of said other of said machines to provide a torque tending to maintain corresponding angles between the relatively rotatable members of all of said machines.

5. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, a source of alternating current, a transformer having a primary winding connected to said source and two electrically independent secondary windings, at least one of said machines having field windings upon the other member thereof excited in quadrature from said secondary windings, said secondary windings being movable with respect to said primary winding to increase the output voltage of one of said secondaries while decreasing the output voltage of the other of said secondaries in order to rotate the field produced by said exciting windings to compensate for a load upon a machine operating as a receiver, said other members of the other of said machines having means acting with the synchronizing field of said other of said machines to provide a torque tending to maintain corresponding angles between the relatively rotatable members of all of said machines.

6. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, at least one of said machines having field windings upon the other member thereof, two alternators having output windings connected across said field windings in quadrature and having field windings, a source of direct current connected to the field windings of said alternators to excite the same, and means to increase the excitation of the field winding of one of said alternators while decreasing the excitation of the field winding of the other of said alternators in order to rotate the oscillating field produced in said machine having field windings excited in quadrature to compensate for a load upon a machine operating as a receiver, said other members of the other of said machines having means acting with the synchronizing field of said other of said machines to provide a torque tending to maintain corresponding angles between the relatively rotatable members of all of said machines.

7. In a self-synchronous system, a plurality of motors having relatively rotatable members, a phase wound winding upon one member of each machine, the phase wound windings of the machines being interconnected with each other to provide for the flow of synchronizing currents between the machines and through said phase wound windings in order to provide synchronizing fields in said machines, two electrically independent sources of alternating current, at least one of said machines having a single closed field winding upon the other member thereof excited in quadrature from said sources of alternating current, and means to vary the extent of excitation in one quadrature axis with respect to the other quadrature axis to rotate the field produced by said excitation in order to compensate for a load upon a machine operating as a receiver, said other members of the other of said machines having means acting with the synchronizing field of said other of said machines to provide a torque tending to maintain corresponding angles between the relatively rotatable members of all of said machines.

LELAND C. WEATHERS.